United States Patent [19]
Pai

[11] Patent Number: 5,865,384
[45] Date of Patent: Feb. 2, 1999

[54] SPICE GRINDER

[76] Inventor: Chung-Jen Pai, No. 10, Lane. 423, Ching Shin St., Chung Ho, Taipei Hsien, Taiwan

[21] Appl. No.: 866,345

[22] Filed: May 30, 1997

[51] Int. Cl.[6] .................................................. B02C 19/12
[52] U.S. Cl. ........................ 241/93; 241/101.3; 241/169.1
[58] Field of Search ............................... 241/101.3, 168, 241/169.1, 63, 93

[56] References Cited

U.S. PATENT DOCUMENTS

| | | |
|---|---|---|
| 4,187,992 | 2/1980 | DeValle .................................... 241/65 |
| 4,925,150 | 5/1990 | Tedioli ................................. 241/169.1 |
| 5,364,037 | 11/1994 | Bigelow .................................... 241/93 |

Primary Examiner—Joseph J. Hail, III
Assistant Examiner—Gilbert Shepherd
Attorney, Agent, or Firm—Bacon & Thomas, PLLC

[57] ABSTRACT

Spice is ground into variable particle sizes by a manually or electrically grinder including a housing, a spindle, a grinding device, a particle size adjusting device, and a driving device. The housing has a housing ring at an upper portion and a partition seat with a seat hole at a lower portion. The housing ring has a housing hole. The spindle is angular and has a baffle piece at its bottom. The grinding device is comprised of a conical grinding disk and a circular, stepped grinding base. The grinding disk has a central angular hole for passage of a spindle to transmit movement to the disk.

5 Claims, 4 Drawing Sheets

SPICE GRINDER

BACKGROUND OF THE INVENTION (a) Field of the Invention

The present invention relates generally to a grinder, and more particularly to an improved spice grinder which may be manually or electrically operated, and which is provided with a particle size adjusting device located at a bottom of the grinder for achieving spice powder of a desirable particle size.

(b) Description of the Prior Art

It is very common for people to use pepper powder, curry powder, coffee beans (herein generally referred to as spice) in the preparation of food or drinks. Ground spice may readily dissolve in liquid or may be distributed evenly on the food.

Take the most commonly used powdered spice, pepper powder, as an example. The traditional way is to put pepper powder in a container having a cap with many tiny holes. In use, the user shakes the container up and down so that the pepper powder drops onto the food or soup. The major drawback with this method is that the pepper powder will easily become damp so that the powder particles stick together to block the tiny holes. In order to improve this drawback, grains of rice are put into the container to prevent the pepper powder from becoming lumpy. However, this method is not very effective. In addition, if the spice is pre-ground into powder and put into a container, it may easily oxidize due to contact with air. As a result, the smell of the spice may be affected, and the inherent property of the spice may change.

In recent years, there have been available powder grinders which are of two types. That is, grains of pieces of spice are put into a grinder which is manually or electrically operated to grind the grains or pieces into powder for direct sprinkling onto food or soup. Such grinders provide instant grinding and are quite popular among users. However, with these grinders, it is not possible to adjust the particle size of the ground powder, or the particle size adjusting device is located at an upper portion of the grinder and remote from the grinding disk so that it is not very effective.

SUMMARY OF THE INVENTION

A primary object of the present invention is to provide an improved grinder which may be manually or electrically operated, and which is provided with a particle size adjusting device located at a bottom of the grinder for achieving spice powder of a desirable particle size.

Another object of the present invention is to provide an electric grinder having pertinent circuit means so that, when the grinder is in operation, a light device located at the bottom of the grinder may light up to facilitate the user to control the amount of spice to be sprinkled onto the food or soup.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
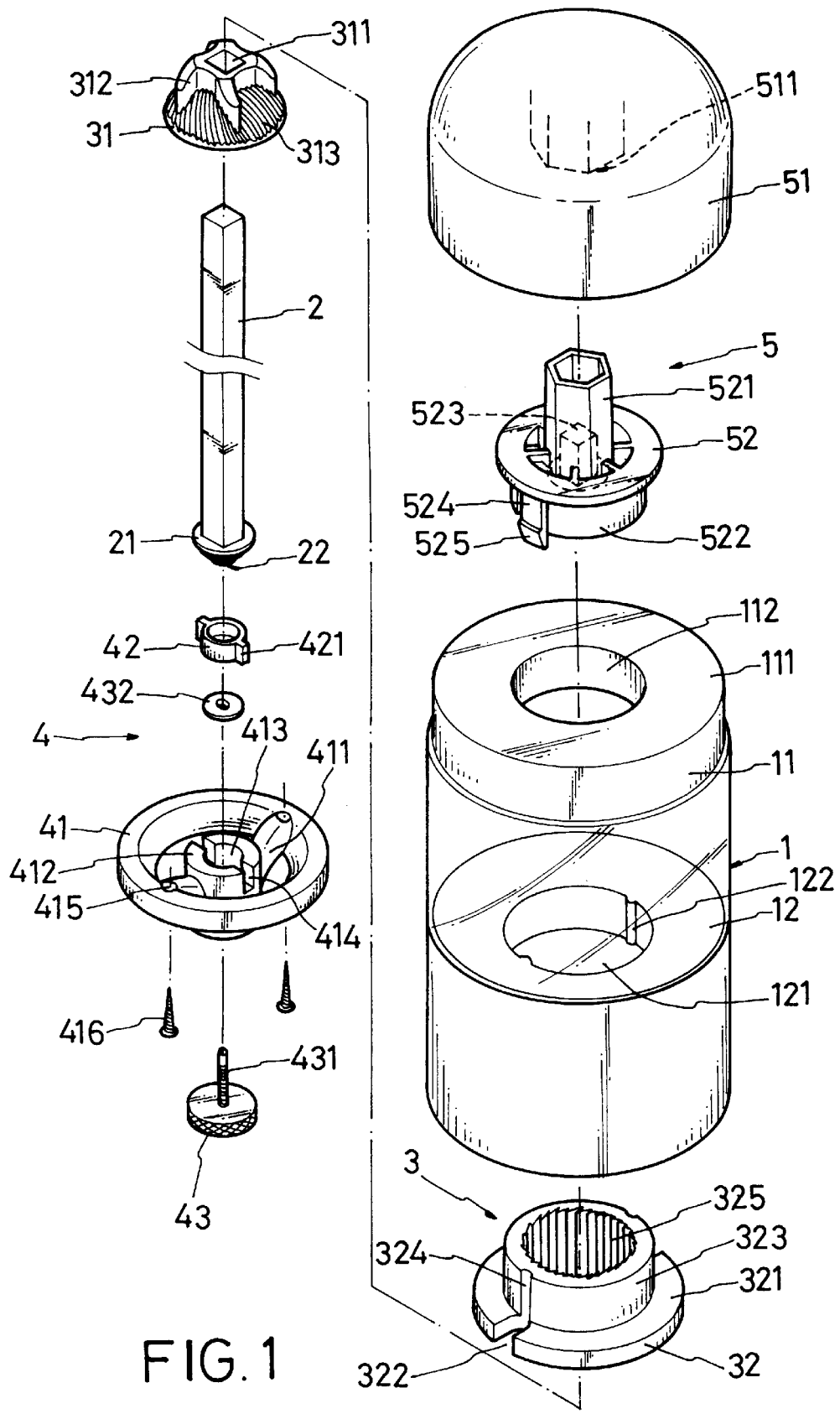
FIG. 1 is an exploded perspective view of a grinder of the present invention.

As shown in the drawings, the present invention essentially comprises a housing 1, a spindle 2, a grinding device 3, an adjusting device 4, and a driven device 5.

Figure 2:
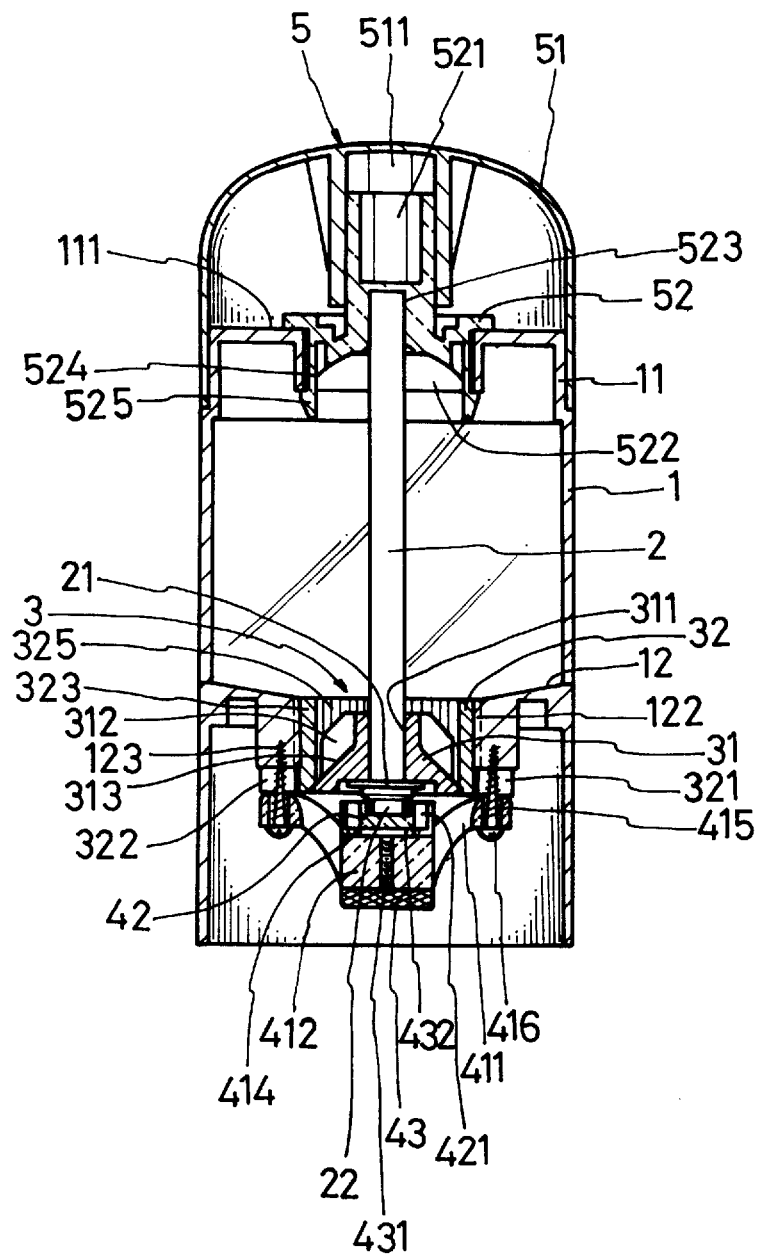
FIG. 2 is an assembled sectional view of a first preferred embodiment of the present invention.

The housing 1 is a hollow container having a housing ring 11 at an upper portion and a partition seat 12 at a middle portion. The housing ring 11 includes a ring 111 having a housing hole 112 longitudinally formed at a center thereof for receiving grains or pieces of spice. The partition seat 12 inclines downwardly towards the center of the housing 1 so that spice may move along the partition seat 12 to a seat hole 121 at the center. In order that the seat hole 121 and the grinding device 3 may be insertably positioned, the seat hole 121 is provided with two ribs 122 at opposite sides thereof. Each rib 122 is provided with a rib hole 123 (see FIG. 2) at a bottom end thereof for coupling with the adjusting device 4.

The spindle 2 is a bar structure having a polygonal cross section. It has a baffle piece 21 at a bottom end thereof so that the spindle 2 may pass through a grinding disk 31 of the grinding device 3 for purposes of positioning and synchronous rotation. The baffle piece 21 has a boss 22 projecting from a lower end thereof for connection with the adjusting device 4 so as to adjust the level of the grinding disk 31.

The grinding device 3 is comprised of the grinding disk 31 and a grinding base 32. The grinding disk 31 is a substantially conical disk structure having a polygonal hole 311 at a center thereof for passage of the spindle 2. A plurality of oblique, radial disk wings 312 extend integrally from a periphery of a wall defining the angular hole 311. The ends of the disk wings 312 are configured to be pointed in shape for moving the spice to be ground. The grinding disk 31 further has a multiplicity of obliquely arranged teeth 313 below the wings 312 for moving the spice as well. The grinding base 32 is a circular stepped structure having a larger base rim 321 at a lower portion thereof and a grinding cylinder 323 of a smaller diameter at an upper portion thereof. The base rim 321 has a notch 322 at either side thereof, and the grinding cylinder 323 is provided with an indentation 324 at either side thereof corresponding to the notches 322 for retaining the ribs 122 so that the grinding base 32 may be secured and located in the partition seat 12. In addition, a periphery of an inner wall of the grinding cylinder 323 is provided with a plurality of oblique grinding teeth 325. Since the inner diameter of the grinding cylinder 323 is slightly smaller than the outer diameter of the bottom of the grinding disk 31, there is always a clearance between the grinding disk 31 and the grinding cylinder 323. Therefore, when the grinding disk 31 rotates, spice will fall among the disk wings 312 and be pushed about by the disk wings 312 and the disk teeth 313 to displace along the grinding teeth 325 and be ground, and the spice particles thus ground have different particle size. The particles will then move along the disk teeth 313 and displace downwardly into the clearance between the grinding teeth 325 and the disk teeth 313 and drop out of the grinding device 3. Powdered spice of uniform particle size may thus be achieved.

The adjusting device 4 is comprised of an annular base disk 41 with a wing 411 extending from either side thereof.

Both wings 411 extend to a disk post 412 at a center of the base disk 41. The disk post 412 has a disk hole 413, and two slots 414 formed at two opposite ends of an outer wall thereof for receiving a disk packing 42 in the disk hole 413. The disk packing 42 has two side wings 421 which may be received in the wing slots 414 of the disk 41. There is also provided a knob 43 with a screw rod 431 at an upper side thereof for passing through the disk hole 413 of the disk post 412 to lock with a packing piece 432 so as to prevent disengagement of the knob 43 from the disk post 412. And when the knob 43 is turned, the disk packing 42 may displace upwardly and downwardly and further cause the boss 22 in contact with the disk packing 32 to displace therewith, so that the displacement of the grinding disk 31 may adjust the size of the clearance at the bottom of the grinding base 32 so as to thereby control the particle size. In addition, the base disk 41 is provided with bottom holes 415 corresponding to the rib holes 123 so that screws 416 may pass through the bottom holes 416 and the notches 322 to lock with the rib holes 123, thereby the adjusting device 4, the grinding device 3, and the spindle 2 may be fixedly disposed in the housing 1.

The driving device 5, as shown in FIG. 1, is manually operated. It comprises an upper cover 51 having an internal diameter corresponding to the housing ring 11, and a rotary seat 52. The upper cover has an insert hole 511 at the center of an inner wall thereof for coupling with an insert post 521 of the rotary seat 52, and the rotary seat 52 has a connecting post 522 at a bottom end thereof with a size matching the housing hole 112. The rotary seat 52 further has an angular hole 523 below the connecting post 522 for receiving the spindle 2. An outer side of the connecting post 522 is provided with two or more connecting projections 524 of a certain resilience. Each connecting projection 524 has a hook portion 525 at an extreme end thereof. The hooks 525 may hook the inner wall of the housing hole 112 after insertion of the rotary seat 52 into the housing hole 112, so that the upper cover 51 will not disengage from the housing 1. When th upper cover 51 is turned, the spindle 2 and the grinding disk 41 may be brought to rotate synchronously, and the spice dropped in between the grinding disk 41 and the grinding base 32 may be ground into particulates, which are further ground by the grinding teeth 525 and the disk teeth 313 into powder, ready to be served. If the particle size of the thus obtained spice powder is not satisfactory, the knob 43 may be turned so that the spindle 2 displaces upwardly and downwardly to change the size of the clearance between the disk teeth 313 and the grinding teeth 325.

Figure 3:
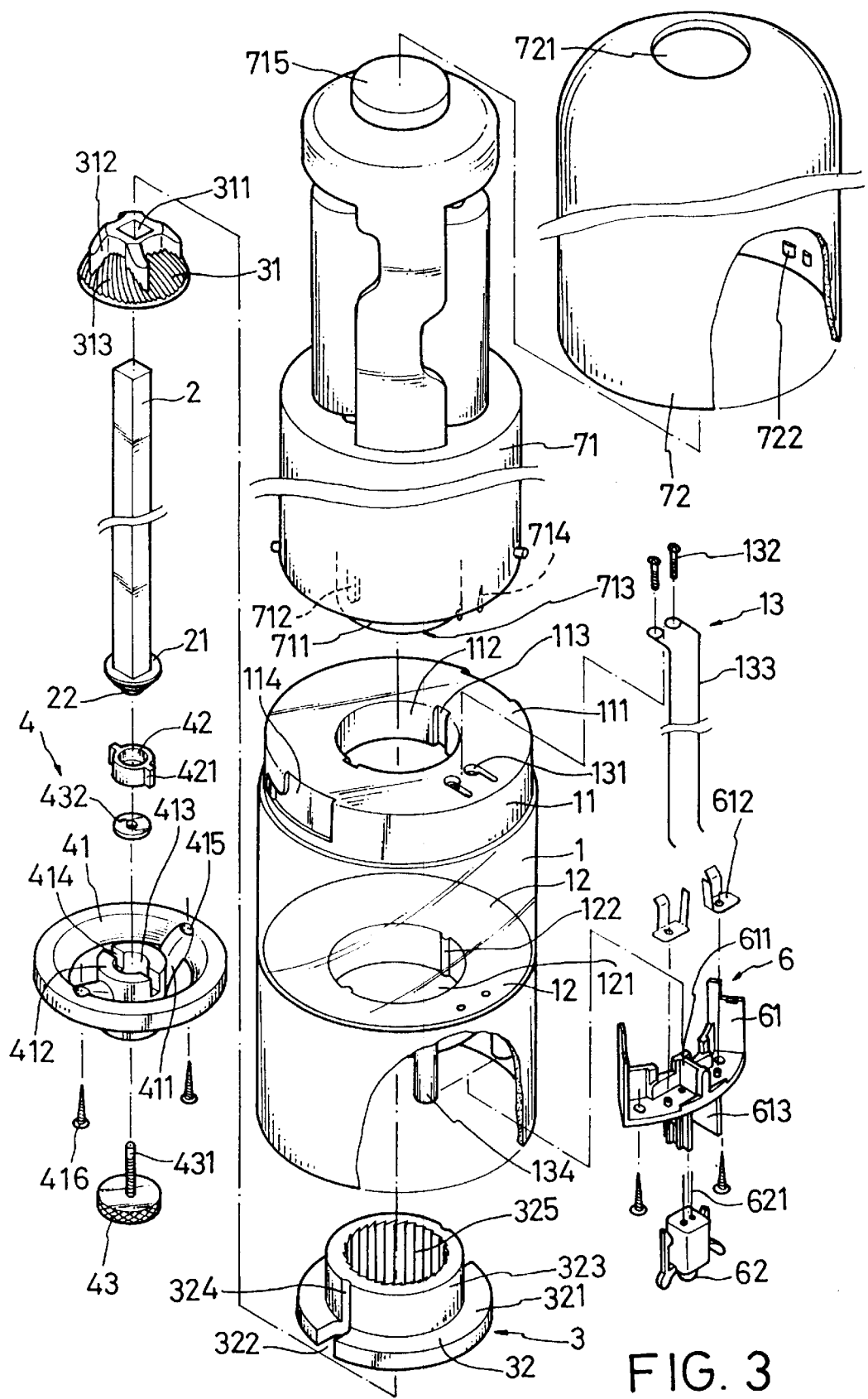
FIG. 3 is an exploded perspective view of a second preferred embodiment of the present invention.
Figure 4:
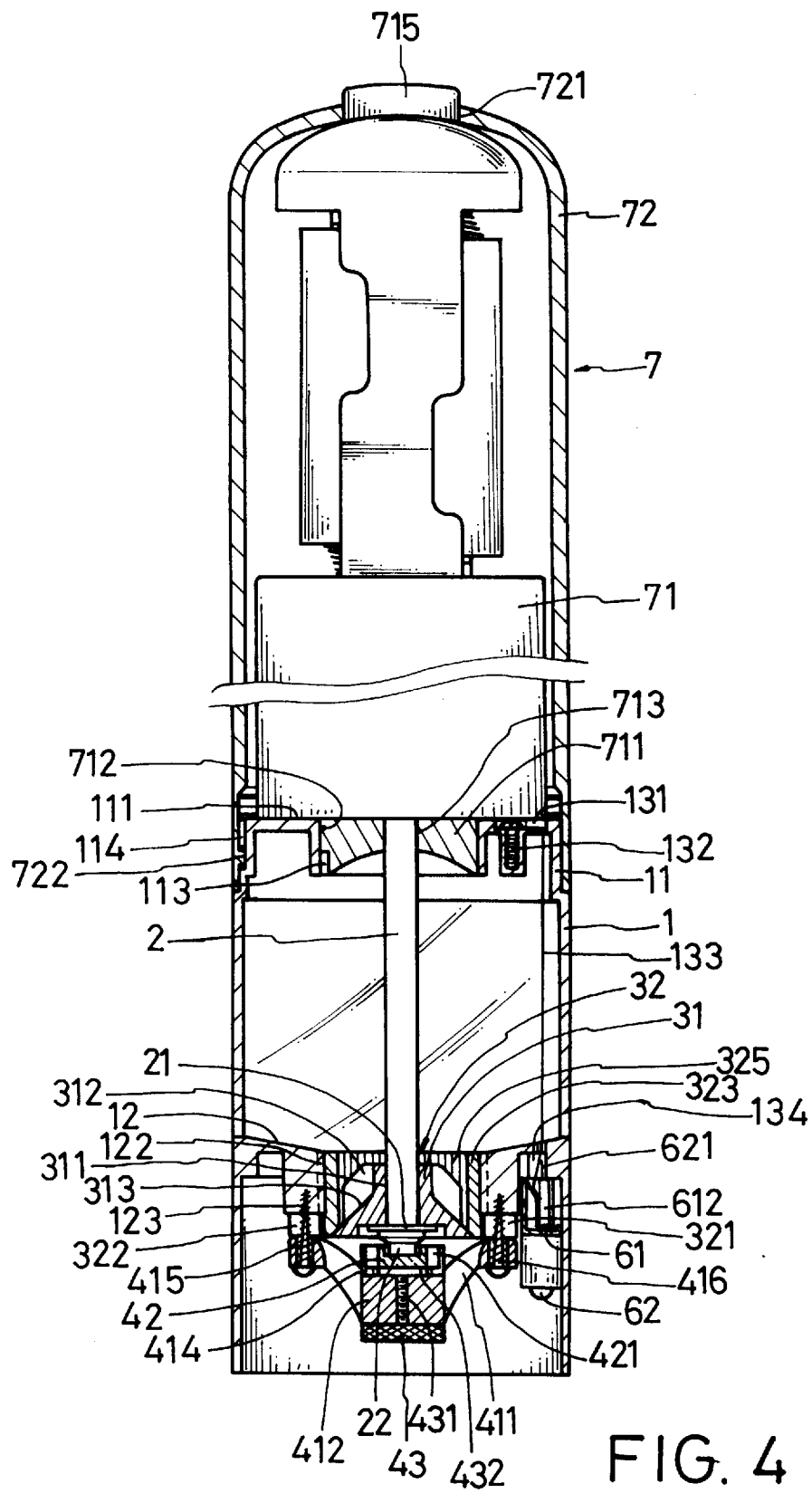
FIG. 4 is a sectional view of the second preferred embodiment of the present invention.

Reference is made to FIG. 3, which shows a second preferred embodiment of the present invention in which the grinder is electrically operated. In this embodiment, the spindle 2, the grinding device 3, and the adjusting device 4 are of the same structure as those in the first embodiment described above. The housing 1 in this embodiment is further provided with a circuit device 13 disposed on the ring 111. The circuit device 13 includes two electrically conductive screws 132 disposed respectively in two connecting holes 131 in an upper side of the circuit device 13 for urging against two lead wires 133 therein. Each lead wire 133 passes through the partition seat 12 and is located between two rib posts 134 at one side of the seat hole 121 for connection with a lighting device 6.

The lighting device 6 includes a curved light base 61 having a partition plate 611 disposed at its center. An electrically conductive terminal 612 is disposed at either side of the light base 61 for pivotal connection with the corresponding lead wire 133 of the circuit device 13. In addition, two projecting plates 613 with retaining grooves respectively extend from a bottom side of the light base 61 for receiving a light bulb 62, such that two connecting poles 621 of the light bulb 62 pass through the light base 61 to connect with the corresponding electrically conductive terminals 612 to make the electrical connection.

Additionally, in order that the housing 1 may be connected to an electrical driving device 7, two retaining grooves 113 are respectively provided at two opposing sides of an inner wall of the housing ring 11, and guide grooves 114 are provided at two opposing sides of an outer wall of the housing ring 11, so that posts 712 at two sides of a mounting column 711 at a bottom side of a power device 71 may be rotatably inserted into the retaining grooves 113, such that a rotatable angular hole 713 in the power device 71 may couple with the spindle 2 to transmit movement. That side of the mounting column 711 corresponding to the positions of the two connecting holes 131 is provided with two electrically conductive rods 714 for contact with the electrically conductive screws 132 to make the electrical connection. The power device 71 is internally provided with circuits connecting a battery means, a motor means, a speed change means and the electrically conductive rods 714. An output shaft of the motor means is connected to the above-mentioned angular hole 713. A switch button 715 is disposed at a top side of the power device 71 for switching of the circuits.

In addition, the power device 71 is externally fitted with a shell 72 for concealing the power device 71 therein. The shell 72 is provided with a through hole 721 at a position corresponding to that of the switch button 715 so that the latter may project therefrom. Besides, the shell 72 is provided with retaining lugs 722 at an inner surrounding wall thereof for insertion into the guide grooves 114 or ring 111 after it is fitted onto the power device 71. Then the shell 72 is further rotated so that it is coupled to the housing 1 to complete the assembly.

When the switch button 715 is pressed, relevant elements in the power device 71 will be actuated. Further, the angular hole 713 causes the spindle 2 to rotate; and by means of the associated movement of the grinding base 32 and the grinding disk 31, the spice may be ground into fine powder. On the other hand, the electrically conductive rods 714 are connected to the electrically conductive screws 132 to make the electrical connection. At this point, the light bulb 62 of the lighting device 6 will light up to provide a light source for the user when sprinkling the spice.

Furthermore, both of the grinding disk 31 and the grinding base 32 according to the present invention are made of acid and alkali proof, durable, and anti-oxidation precision ceramics so that they will not react with the spice.

As mentioned above, the particle size of the spice may be adjusting by turning the knob 43 of the adjusting device 4. When the knob 43 is turned upwardly, since the disk teeth 313 are inclined, the clearance between the disk teeth 313 and the grinding teeth 325 is diminished, so that the particle size of the spice powder thus ground becomes smaller. On the contrary, if the knob 43 is turned downwardly, the particle size of the spice powder becomes greater By means of the present invention, the housing may be coupled with the manually rotatable upper cover so that grinding may be achieved by turning of the upper cover. In addition, the housing disclosed in the present invention may be connected to a power device and a shell to grind spice on a larger scale. And when the battery energy is consumed, the user may take down the power device and replace it with the upper cover to continue the grinding process manually. Besides, the present invention is equipped with a lighting device when used in conjunction with the power device. In view of the above, the present invention does provide vast improvements over the existing art.

Although the present invention has been illustrated and described with reference to the preferred embodiments thereof, it should be understood that it is in no way limited to the details of such embodiments but is capable of numerous modifications within the scope of the appended claims.

What is claimed is:

1. A grinder, comprising:

a hollow housing having a housing ring at an upper portion thereof and a partition seat at a middle portion thereof, said housing ring including a ring having a housing hole, said partition seat inclining downwardly towards a center of said hollow housing and having a seat hole;

a spindle in the form of a polyangular rod and having a baffle piece at a bottom thereof;

a grinding device, comprising a conical grinding disk and a circular, stepped grinding base, said grinding disk having an angular hole at a center thereof for passage of said spindle therethrough to transmit movement, said angular hole having a plurality of inclined, radial disk wings extending integrally from a periphery of a wall defining the angular hole, a multiplicity of obliquely extending disk teeth interdisposed among said disk wings; said grinding base having a base rim at a lower portion thereof and a grinding cylinder at an upper portion thereof for insertion into said seat hole, said grinding cylinder having a plurality of oblique grinding teeth at an inner surrounding wall thereof, said spindle being passed through said grinding cylinder for rotation of said grinding disk and grinding a spice disposed between said disk wings and said grinding teeth into pieces, the pieces being further ground by said disk teeth and said grinding teeth into a spice powder having a particle size smaller than a clearance between said disk teeth and said grinding teeth so that the spice powder may drop out therefrom;

an adjusting device comprising an annular base disk with a pair of wings, each wing extending from an opposite side of said base disk, said wings extending to a disk post at a center of said base disk, said disk post having a disk hole and two wing slots, a disk packing having two side wings being disposed in said disk hole, with said two side wings located in said wing slots, a screw rod of a knob being passed through said disk hole of said disk post to lock with a packing piece, whereby when said knob is turned said disk packing may displace upwardly and downwardly and further cause said spindle connected with said disk packing to also displace upwardly and downwardly for adjusting the clearance between said disk teeth and said grinding teeth, a plurality of screws being passed through said base disk to lock said grinding base to a bottom of said partition seat; and a driving device having an angular hole connected with said spindle.

2. The grinder as claimed in claim 1, wherein said grinding disk and said grinding base are made of ceramic material.

3. The grinder as claimed in claim 1, wherein said driving device comprises an upper cover and a rotary seat, said upper cover having an internal diameter corresponding to said housing ring and having an insert hole at the center of an inner wall thereof for coupling with an insert post of said rotary seat, said rotary seat having a connecting post at a bottom end thereof of a size matching said housing hole and an angular hole disposed below said connecting post for receiving said spindle, an outer side of said connecting post being provided with at least two resilient connecting projections, each projection having a hook portion for engaging an inner wall of said housing hole for manually rotating said upper cover on said housing ring.

4. The grinder as claimed in claim 1, wherein said driving device is comprised of circuit means connected to a battery means, a motor means, a power device of a speed change device, and a shell, and wherein said housing has at least two retaining grooves provided at an inner wall of said housing hole and at least two guide grooves disposed at a periphery of said housing ring so that a plurality of posts of a mounting column at a bottom side of said power device may be rotatably inserted into said retaining grooves, and an angular hole in said power device may couple with said spindle, a switch button being further disposed at a top side of said power device, said shell having a size slightly greater than that of said power device, and being provided with at least two retaining lugs at an inner surrounding wall thereof for insertion into said guide grooves, said shell being further provided with a through hole at a position corresponding to that of said switch button so that the latter may project therefrom, whereby said switch button may be pressed to start rotation of said spindle to proceed with the grinding operation.

5. The grinder as claimed in claim 4, wherein a lighting device is further provided at one side of said adjusting device, and a circuit device is disposed on said ring of said housing, said circuit device comprising two electrically conductive rods extending from the bottom side of said power device, and said ring being provided with corresponding connecting holes, a plurality of electrically conductive screws being locked in said connecting holes so that a plurality of lead wires in said connecting holes may extend downwardly to pass through said partition seat, said lighting device comprising a curved light base having a partition plate disposed at a center thereof, an electrically conductive terminal being disposed at either side of said light base for pivotal connection with a corresponding lead wire of said circuit device, a pair of projecting plates with retaining grooves respectively extending from a bottom side of said light base for receiving a light bulb, such that two connecting poles of said light bulb may pass through said light base to connect with the corresponding electrically conductive terminals, whereby said switch button may be pressed to light up said light bulb.

* * * * *

(12) EX PARTE REEXAMINATION CERTIFICATE (5553rd)
United States Patent
Pai

(10) Number: US 5,865,384 C1
(45) Certificate Issued: Oct. 10, 2006

(54) SPICE GRINDER

(76) Inventor: Chung-Jen Pai, No. 10, Lane. 423, Ching Shin St., Chung Ho, Taipei Hsien (TW)

Reexamination Request:
No. 90/007,069, Jun. 14, 2004

Reexamination Certificate for:
Patent No.: 5,865,384
Issued: Feb. 2, 1999
Appl. No.: 08/866,345
Filed: May 30, 1997

(51) Int. Cl.
*B02C 19/00* (2006.01)

(52) U.S. Cl. .................... 241/93; 241/101.3; 241/169.1
(58) Field of Classification Search ............... 241/93, 241/101.3, 169.1
See application file for complete search history.

(56) References Cited

U.S. PATENT DOCUMENTS 4,685,625 A * 8/1987 Mazza ....................... 241/36

FOREIGN PATENT DOCUMENTS

TW 192000 * 10/1992
TW 206363 * 5/1993

* cited by examiner

*Primary Examiner*—Jimmy G. Foster

(57) ABSTRACT

Spice is ground into variable particle sizes by a manually or electrically grinder including a housing, a spindle, a grinding device, a particle size adjusting device, and a driving device. The housing has a housing ring at an upper portion and a partition seat with a seat hole at a lower portion. The housing ring has a housing hole. The spindle is angular and has a baffle piece at its bottom. The grinding device is comprised of a conical grinding disk and a circular, stepped grinding base. The grinding disk has a central angular hole for passage of a spindle to transmit movement to the disk.

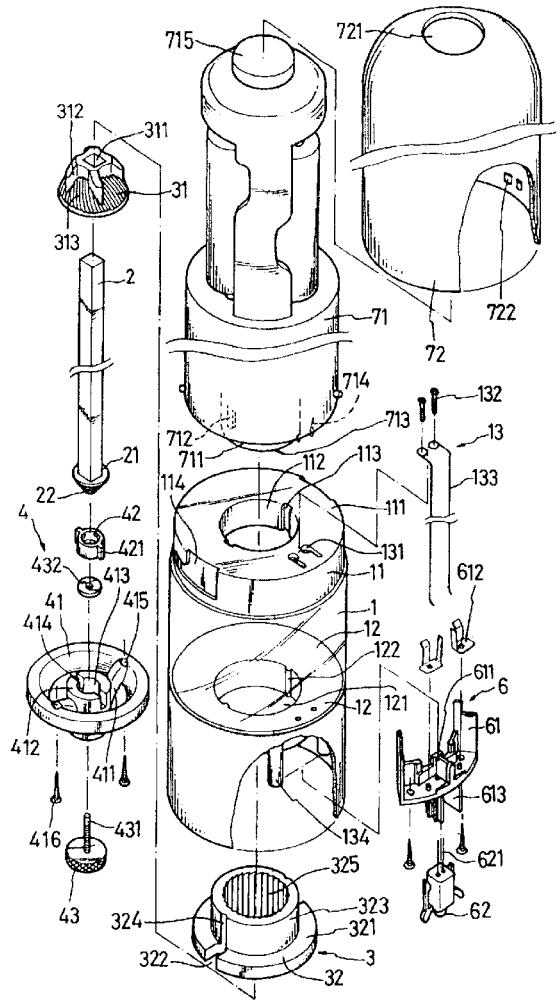

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *